(12) United States Patent
Meeuwsen

(10) Patent No.: US 6,461,549 B1
(45) Date of Patent: Oct. 8, 2002

(54) METHOD OF PRODUCING A BIODEGRADABLE PRODUCT

(75) Inventor: Marinus Comelis Meeuwsen, Helmond (NL)

(73) Assignee: Potatopak Limited (GB)

( * ) Notice: Subject to any disclaimer, the term of this patent is extended or adjusted under 35 U.S.C. 154(b) by 0 days.

(21) Appl. No.: 09/462,604

(22) PCT Filed: Jul. 8, 1998

(86) PCT No.: PCT/NL98/00392
§ 371 (c)(1),
(2), (4) Date: Mar. 10, 2000

(87) PCT Pub. No.: WO99/02598
PCT Pub. Date: Jan. 21, 1999

(30) Foreign Application Priority Data

Jul. 9, 1997 (NL) .............................. 1006518

(51) Int. Cl.[7] ........................ B27N 3/02; B30B 15/30; C08L 89/00; C08L 91/06
(52) U.S. Cl. ................... 264/40.4; 264/109; 264/122; 524/47; 524/276; 524/277
(58) Field of Search ............... 264/40.4, 112, 264/118, 109, 122; 524/47, 276, 277

(56) References Cited

U.S. PATENT DOCUMENTS 4,040,899 A * 8/1977 Emerson et al. ............. 162/13
5,284,166 A * 2/1994 Cartwright et al. ......... 131/365
5,284,431 A * 2/1994 Kuwabara et al. .......... 425/148
5,308,566 A   5/1994 Huder
5,389,322 A   2/1995 Kim et al.
2001/0048176 A1 * 12/2001 Franke et al. ................ 524/47

FOREIGN PATENT DOCUMENTS

| DE | 39 37 168 | 5/1991 |
| DE | 42 30 040 | 4/1993 |
| DE | 42 03 211 | 8/1993 |
| DE | 43 33 909 | 4/1995 |
| EP | 537 110   | 4/1993 |
| NL | 9100590   | 11/1992 |
| NL | 9402248   | 1/1996 |
| WO | WO 96/03886 | 2/1996 |

* cited by examiner

Primary Examiner—Jan H. Silbaugh
Assistant Examiner—Adam R. Harris
(74) Attorney, Agent, or Firm—Akerman Senterfitt

(57) ABSTRACT

A method of producing a biodegradable product. which is intended, for instance, for only temporarily containing foodstuffs, or of producing objects such as a container for snacks, a beaker for hot or cold, drinks, etc., which product is. manufactured under pressure and heat in a mold from a basic material. The method is characterized in that the composition of the basic material consists of a moist granulate consisting of 50–250 parts by weight amylose-comprising flour derived from an edible crop plant, 10–85 parts by weight wood flour, 2–30 parts by weight natural wax and 50–250 parts by weight water and optionally a natural colorant as an additive.

18 Claims, No Drawings

METHOD OF PRODUCING A BIODEGRADABLE PRODUCT

BACKGROUND OF THE INVENTION

The present invention relates to a method of producing a biodegradable product which is intended, for instance, for only temporarily containing foodstuffs, or of producing objects such as a container for snacks, a beaker for hot or cold drink, etc., which product is manufactured under pressure and heat in a mould, based on a basic material whose composition comprises amylose-comprising flour derived from an edible crop plant, wood flour, natural wax and water.

Methods of the above-mentioned kind are known from the prior art, for instance, from the published Dutch patent applications Nos. 9402248 and 9100590. The object of these kinds of methods is to provide disposable products which are to be used only for a short period of time such as small containers, bowls, plates, etc. of a kind whose production and waste disposal cause the least possible environmental pollution.

Up to date it has been proven to be impossible to manufacture a product in accordance with the methods of the prior art which is suitable to contain for a reasonable length of time a wet and at the same time hot substance, such as a meal, soup, etc. heated in the microwave oven. For such applications the product, for instance a container for a meal, is required to be resistant to the heat from the substance it contains, and likewise, it must not readily loose its strength and firmness as a result of the moisture it contains.

Another disadvantage of the products according to the prior art is that they are relatively breakable. Further, their manufacture involves a relatively complicated process in which the components of the basic material are mixed to a relatively thin kind of batter, the batter is conveyed via a pipe system to the mould cavity where, with the aid of an injection nozzle, it is injected into the mould. A further disadvantage is that this manner of working results in a relatively great burden on the environment. In view of the fact that the batter is very perishables the mixing device, the mixing vessel and the pipe system must be cleaned regularly with water. The polluted water is then discharged into the sewer system which, in consideration of the environment, is undesirable.

SUMMARY OF THE INVENTION

The object of the invention is to provide a method of the kind mentioned in the preamble in which these disadvantages are substantially met, and by which also new advantages are provided, and is characterized in that the composition of the basic material consists substantially of a moist granulate substantially comprising the following four ingredients: 50–250 parts by weight of flour, 10–85 parts by weight wood flour, 2–30 parts by weight natural wax and 50–250 parts by weight water, the four ingredients together making up substantially 100% of the basic material.

One embodiment includes the four ingredients in the amounts of 75–200 parts by weight flour, 20–25 parts by weight wood flour, 4–20 parts by weight natural wax and 75–200 parts by weight water. In another embodiment, the four ingredients are included in the amounts of 100–175 parts by weight flour, 30–60 parts by weight wood flour, 5–18 parts by weight natural wax and 100–155 parts by weight water. A preferred embodiment includes the four ingredients in the amounts of 140–150 parts by weight flour, 40–50 parts by weight wood flour, 8–10 parts by weight natural wax and 140–150 parts by weight water.

DETAILED DESCRIPTION OF THE INVENTION

It has been shown that by the method according to the invention products can be manufactured which are pre-eminently suitable to contain a warm and at the same time moist substance. For example, tests have shown that according to the method of the invention it is possible to manufacture a soup cup for temporary use which, after having been filled with cold soup, can be placed in the microwave oven for heating the soup, subsequently, after cooling, it can be placed in a freezer for deep freezing the soup, and can then be taken from the freezer and directly placed in the microwave oven for heating the soup again. Even after these various treatments the soup cup was still shown to possess its desired functionality for a sufficient length of time.

Another very important advantage of the invention is that only four different ingredients are required for the composition o the basic material, one of which is ordinary water, such as water from the mains, so that only three different ingredients reed to be stocked. These are simple ingredients and are generally available.

It has also been shown that the products manufactured in accordance with the method are more resistant to mechanical stress, break less easily and are tougher. Surprisingly, the products were also shown to be resistant to many organic solvents such as paint solvent and thinner, allowing the products according to the method to be used or new applications, such as temporarily holding a substance comprising an organic solvent such as paint or the like.

A very important advantage of the invention is also the relatively small amount of water in the basic material. A first advantage in this respect is that, instead of the basic material becoming a more or less liquid batter, it forms a moist granulate which is easily and quickly prepared from few different ingredients. Any spilt granulate can easily be cleaned up by wiping or suction and may even immediately be added again to the stock. The application of a granulate facilitates very accurate metering without the necessity of a pipe system for the transport of the basic material to the mold. In this connection it is advantageous to apply an embodiment of the invention in which per production cycle the method comprises weighing a charge having a weight adapted to manufacturing the respective product and transporting the weighed charge to the respective mold cavity.

It has been shown that the moist granulate used in the method according to the present invention as basic material for the production of the biodegradable products is much less perishable than the commonly used earlier basic materials. For instance, a test has proven that once a granulate has been compounded it can be stored in a vessel or container for two weeks whereafter the granulate, optionally after suppletion of the evaporated water, is still usable for the production of the products. In practical terms this means that during periods of non-production, such as at night or in the weekends, a granulate supply once it has been compounded may be left to stand ready for use again directly thereafter. Thus mixing basins and other parts of the production installation require considerably less frequent cleaning, while moreover this cleaning can be realized by suction, wiping, etc., after which the waste granulate may be added to other biodegradable waste, may be removed and may be composted. Thus there is no discharge into the sewer system, the amount of waste is smaller, less work is required for clearing up the waste, and because of the amount and the type of waste, said waste itself is hardly a burden on the environment.

Another important advantage of the invention is the fact that because of the relatively small amount of water in the basic material, only little water needs to be evaporated while the material is being pressed into the mould. This has a favourable effect on the production cycle time, on the amount of steam that needs to be exhausted, on the behaviour of the basic material in the mould and on the amount of energy required to evaporate the water and consequently for the manufacture of the product. It is estimated that with the aid of the method in accordance with the invention, the product can be manufactured in half the time required for the manufacture of products using the method according to the prior art. The amount of time required for baking the product in the mould may be reduced from approximately 60 seconds to approximately 30 seconds. The energy saving is estimated to be 30 to 40%.

The type of flour may be chosen from the group comprising wheat flour, sago flour, tapioca flour, rice flour corn flour and potato flour. Thus, several kinds of starches are eligible for application in the method in accordance with the invention. Very good results were achieved with potato flour. The important factor is the amount of amylose in the starch. Potato flour contains a relatively high percentage of amylose.

The wood flour may be a resinous wood flour. It has been shown that a resinous wood flour produces a better result than non-resinous types of wood flour. Softwood contains relatively large amounts of resin. Moreover, softwood is used industrially on a large scale, such as in the building trade, with the consequence that an abundance of wood flour from, for instance, saw mills, is available at a low price.

Preferably, the natural wax used in accordance with the method is Carnuba wax, a product which is available on the market in sufficient amounts, has been shown to be very suitable for the method in accordance with the invention.

Alternatively the method in accordance with claim 10 may be used. The basic material may be provided with a natural colorant by using a wood flour which has a natural colour stemming from, for instance, beech wood or other kinds of hardwood. Another possibility is adding a natural colorant to the basic material in order to obtain coloured products.

The method may be carried out at a molding pressure between 5 and 20 bar, preferably between 6 and 13 bar, more preferably between 6 and 10 bar and most preferably at approximately 8 bar. Thus, the molding pressure to be chosen in the method in accordance with the invention may cover a relatively large range. Up till now optimal results have been obtained at a molding pressure of approximately 8 bar.

Likewise, the method may be carried out at a molding temperature between 180° C. and 280° C., preferably between 200° C. and 260° C., more preferably between 225° C. and 255° C. and most preferably at a molding temperature of approximately 250° C. Thus, the molding temperature to be chosen in accordance with the invention may also cover a relatively large range. Up till now good results have been obtained at a molding temperature of approximately 8 bar.

The method may be carried out with a mold closing time of 20–50 seconds. As mentioned earlier, this relatively short closing time, which is a consequence of the fact that the granulate-like basic material of the invention contains relatively little water, suffices for the manufacture of products possessing the desired qualities.

Advantageously the method of the previously mentioned method in which per production cycle the method comprises weighing a charge having a weight adapted to manufacturing the respective product and transporting the weighed charge to the respective mold cavity may be applied. In this method always weighted portions of granulate are introduced into, the respective mold cavities, permitting very good control over the actual filling of the mold. In order to avoid unnecessary waste and finishing of the product, it is important that while the product is being molded, as little as possible of the material is squeezed out from the mold. In this respect the method affords the possibility to obtain a great degree of accuracy and reproducibility of the production process. To illustrate the improved properties obtained with a product manufactured in accordance with the method of the invention, reference is made to the following test. An elongated container was manufacture departing from a basic material as known from the above-mentioned Dutch patent application 9100591 and for comparison a container of the same dimensions was manufactured from a basic material consisting substantially of a moist granulate comprising the following four ingredients 140–150 parts by weight flour, 40–50 parts by weight wood flour, 8–10 parts by weight natural wax and 140–150 parts by weight water, the four ingredients together making up substantially 100% of the basic material. At their top rim the containers had the following dimensions: length 95 mm, width 55 mm. The height of the container as measured on the outside was 40 mm. The side walls of the container formed an approximately 25 degree angle with the bottom. The material thickness of the container at the bottom, as well as anywhere else, was substantially 2 mm. The containers were inverted and placed with their open top onto a flat table, and along the long sides of the contain; fillets were fixed onto the table, contacting the long sides of the container. A pressure punch having a diameter of 8 mm was placed on the under side of the container, contacting the bottom directly adjacent to where the bottom runs into a container side. Under equal conditions products manufactured from the earlier basic materials were shown to be resistant to a pressure punch of 1.2 to 2 kg. Product manufactured in accordance with the invention were capable of resisting a pressure punch of 3.5 to 4 kg.

These results show that the invention improves the strength of the manufactured product compared with the products manufactured according to the prior art. One may also derive from the results that a product manufactured by a method according to the invention and having a strength which is equal to that of the products according to the known prior art, may have a lesser wall thickness, which would mean a saving of material and at the same time less of a burden on the environment.

In addition it was shown that containers manufactured by the method according to the invention were well suited for holding hot and at the same time wet substances. For example, tests were carried out with hot ground-nut sauce and hot water. After 20 minutes the containers were still effectively usable. Even after twelve hours the test products were still quite usable. After twenty-four hours no deformation had yet occurred and after forty-eight hours the water was evaporated from the previously water-felled test products. The product had not become leaky but began to exhibit signs of softening.

Although in the above the invention is elucidated with reference to various embodiments, the invention is in no way limited to these, on the contrary, all embodiments covered by the appended independent claim 1 are deemed to be within the scope of the invention. Optionally further ingredients may be added to the basic material, for example, to obtain special effects or properties.

I claim:

1. A method of producing a biodegradable product, wherein said product is manufactured under pressure and heat in a mold from a basic material, wherein the composition of the basic material consists of a moist granulate consisting of the following four ingredients:

50–250 parts by weight amylose-comprising flour derived from an edible crop plant, 10–85 parts by weight wood flour, 2–30 parts by weight natural wax and 50–250 parts by weight water, and optionally a natural colorant as an additive.

2. The method in accordance with claim 1, wherein the composition of the basic material consists of a moist granulate consisting of the following four ingredients:

75–200 parts by weight amylose-comprising flour derived from an edible crop plant, 20–25 parts by weight wood flour, 4–20 parts by weight natural wax and 75–200 parts by weight water, and optionally a natural colorant as an additive.

3. The method in accordance with claim 1, wherein the composition of the basic material consists of a moist granulate consisting of the following four ingredients:

100–175 parts by weight amylose-comprising flour derived from an edible crop plant, 30–60 parts by weight wood flour, 5–18 parts by weight natural wax and 100–155 parts by weight water, and optionally a natural colorant as an additive.

4. The method in accordance with claim 1, wherein the composition of the basic material consists of a moist granulate consisting of the following four ingredients:

140–150 parts by weight amylose-comprising flour derived from an edible crop plant, 40–50 parts by weight wood flour, 8–10 parts by weight natural wax and 140–150 parts by weight water, and optionally a natural colorant as an additive.

5. The method in accordance with claim 1, wherein the mold includes a mold cavity for receiving a weighed charge, and wherein per production cycle the method comprises weighing a charge having a weight adapted to manufacturing the respective product and transporting the weighed charge to the respective mold cavity.

6. The method in accordance with claim 1, wherein the amylose-comprising flour is selected from the group consisting of wheat flour, sago flour, tapioca flour, rice flour corn flour and potato flour.

7. The method in accordance with claim 1, wherein the wood flour is a resinous wood flour.

8. The method in accordance with claim 7, wherein the wood flour originates from softwood.

9. The method in accordance with claim 1, wherein the natural wax is Carnauba wax.

10. The method in accordance with claim 1, wherein the method is carried out at a molding pressure between 5 and 20 bar.

11. The method in accordance with claim 10, wherein the method is carried out at a molding pressure between 6 and 13 bar.

12. The method in accordance with claim 11, wherein the method is carried out at a molding pressure between 6 and 10 bar.

13. The method in accordance with claim 12, wherein the method is carried out at a molding pressure of approximately 8 bar.

14. The method in accordance with claim 1, wherein the method is carried out at a molding temperature between 180° C. and 280° C.

15. The method in accordance with claim 14, wherein the method is carried out at a molding temperature between 200° C. and 260° C.

16. The method in accordance with claim 15, wherein the method is carried out at a molding temperature between 225° C. and 255° C.

17. The method in accordance with claim 16, wherein the method is carried out a molding temperature of approximately 250° C.

18. The method in accordance with claim 1, wherein the method is carried out with a mold closing time of 20–50 seconds.

* * * * *

UNITED STATES PATENT AND TRADEMARK OFFICE
CERTIFICATE OF CORRECTION

PATENT NO. : 6,461,549 B1
DATED : October 8, 2002
INVENTOR(S) : Meeuwsen

It is certified that error appears in the above-identified patent and that said Letters Patent is hereby corrected as shown below:

<u>Title page,</u>
Item [75], Inventor, replace "Comelis" with -- Cornelis --
Item [57], ABSTRACT,
Line 1, delete the "." after "product"
Line 4, delete the "," after "cold"
Line 5, delete the "." after "is"

<u>Column 1,</u>
Line 10, replace "drink" with -- drinks --
Line 40, replace "perishables" with -- perishable --

<u>Column 2,</u>
Line 18, replace "o" with -- of --
Line 20, replace "reed" with -- need --
Line 27, replace "or" with -- for --
Line 54, replace "in" with -- on --

<u>Column 3,</u>
Line 16, add a "," after "rice flour"

<u>Column 4,</u>
Line 3, delete the "," after "into"
Line 13, replace "manufacture" with -- manufactured --
Line 30, replace "contain" with -- container --
Line 58, replace "felled" with -- filled --

Signed and Sealed this

Fifteenth Day of July, 2003

JAMES E. ROGAN
*Director of the United States Patent and Trademark Office*